(12) United States Patent
Jayaraman et al.

(10) Patent No.: US 10,001,973 B2
(45) Date of Patent: Jun. 19, 2018

(54) METHOD AND SYSTEM FOR IMPROVING TESTING SERVICES IN A PROJECT TESTING ENVIRONMENT

(71) Applicant: Wipro Limited, Bangalore (IN)

(72) Inventors: Venkata Subramanian Jayaraman, Chennai (IN); Joji Varghese, Bentonville, AR (US); Madhusudhana Rao Vundavalli, Rogers, AR (US); Devdatta Bendrikar, Centerton, AR (US); Satishchandra Channareddy, Bengaluru (IN)

(73) Assignee: Wipro Limited, Bangalore (IN)

( * ) Notice: Subject to any disclaimer, the term of this patent is extended or adjusted under 35 U.S.C. 154(b) by 0 days. days.

(21) Appl. No.: 14/813,411

(22) Filed: Jul. 30, 2015

(65) Prior Publication Data
US 2017/0131972 A1    May 11, 2017

(30) Foreign Application Priority Data

Jun. 11, 2015 (IN) .......................... 2928/CHE/2015

(51) Int. Cl.
*G06F 9/44* (2018.01)
*G06F 11/36* (2006.01)

(52) U.S. Cl.
CPC .............. *G06F 8/10* (2013.01); *G06F 11/368* (2013.01)

(58) Field of Classification Search
None
See application file for complete search history.

(56) References Cited

U.S. PATENT DOCUMENTS

| | | | |
|---|---|---|---|
| 8,359,566 B2 * | 1/2013 | Chaar | G06F 8/10 717/101 |
| 8,660,878 B2 | 2/2014 | Bernardini et al. | |
| 8,694,969 B2 | 4/2014 | Bernardini et al. | |
| 2014/0019193 A1 | 1/2014 | Eisele et al. | |

OTHER PUBLICATIONS

Brown, B., et al., "Test Factory Setup for SAP Applications", Infosys, Perspective, 2013, pp. 1-8, <www.infosys.com>.

* cited by examiner

*Primary Examiner* — Qamrun Nahar
(74) *Attorney, Agent, or Firm* — LeClairRyan PLLC

(57) ABSTRACT

The present disclosure relates to a method and system for improving testing services in a project testing environment. In an embodiment, the method comprises receiving input data of one or more requirements of a project from a user device. Based on the input data, the number of work units is determined. The work units are associated with the cost value. The work units are determined for each phase of the project testing. During execution of each phase of project testing there is variation in the number of work units. The information associated with the variation in the number of work units is provided to a user device.

16 Claims, 5 Drawing Sheets

# METHOD AND SYSTEM FOR IMPROVING TESTING SERVICES IN A PROJECT TESTING ENVIRONMENT

This application claims the benefit of Indian Patent Application Serial No. 2928/CHE/2015 filed Jun. 11, 2015, which is hereby incorporated by reference in its entirety.

FIELD

The present subject matter is related, in general to software testing, and more particularly, but not exclusively to a method and system for improving testing services in a project testing environment.

BACKGROUND

An important stage of a software development process is testing. Testing helps to ensure that a software product meets its requirements, including functioning in the hardware and software environment. Currently in the software environment, quality is a very important criterion especially during the testing phase. The question of how to reduce the overall cost of the software product but still ensure a quality product is delivered is what is being analyzed by most of the organizations in order to improve customer relations, business operations and quality-related problems.

The conventional methods solve the above mentioned issues by reducing man power there by reducing the time and hence reducing cost. Some other methods are to reduce the cost per hour thereby reducing the overall operational cost. The concept of test factory for managed delivery was also used to solve the above mentioned issue. The managed delivery is a process where a vendor/supplier works for a customer in a mode where the vendor manages all the deliverables and ensures that the vendor provides cost savings to the customer because of effective management. Even though managed delivery is a big success, but there is no single unified technique that could help in providing transparent information about the cost to the customer as in where it is saved and how it is saved and also about how the resources are managed.

The issues mainly faced in software testing are providing transparency to customer on the information regarding overall cost, cost per activity etc. involved in software testing process, timely delivery and resource management.

SUMMARY

Disclosed herein is a method and system for improving testing services in a project testing environment. The project testing system receives data associated with one or more requirements for project testing. Based on the data, the project testing system determines number of work units required for the project testing. The number of work units is associated with cost value. At each phase of the project testing, there is a variation in the number of work units. The information associated with the variation is provided to a customer.

Accordingly, the present disclosure relates to a method for improving testing services in a project testing environment. The method comprises receiving input data of one or more requirements for project testing from a user device. Upon receiving the input data, the number of work units required for the project testing is determined. The method further comprising detecting variation in the number of work units at execution of each phase of the project testing. The information associated with the variation in the number of work units is provided to the user device thereby improving the testing services in the project testing environment.

Further, the present disclosure relates to a system for improving testing services in a project testing environment. The system comprises a processor and a memory communicatively coupled to the processor, wherein the memory stores processor-executable instructions, which, on execution, cause the processor to receive input data of one or more requirements for project testing from a user device. The processor determines number of work unit required for the project testing based on the input data. The processor detects variation in the number of work units at execution of each phase of the project testing. The information associated with the variation in the number of work units is provided to the user device thereby improving the testing services in the project testing environment.

Furthermore, the present disclosure relates to a non-transitory computer readable medium including instructions stored thereon that when processed by at least one processor cause a project testing system to perform the act of receiving input data of one or more requirements for project testing. Further, the instructions cause the processor to determine number of work units required for the project testing. The instructions further cause the processor to detect variation in the number of work units while execution of each phase of the project testing. The instructions furthermore cause the processor to provide information associated with the variation in the number of work units to the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
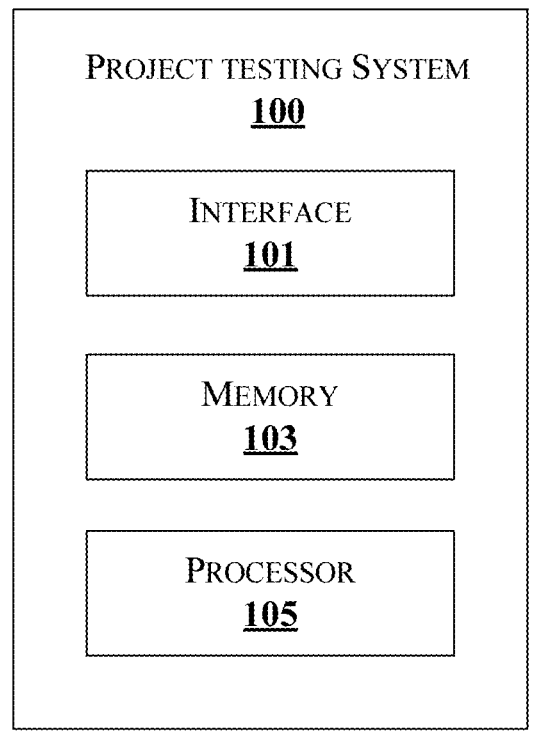
FIG. 1a shows a block diagram illustrating a project testing system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for improving testing services in a project testing environment. The method comprises receiving input data of one or more requirements of a project. The input data is received from a user device. The user device is any computing device capable of receiving and transmitting information. The user device may be associated with a customer. The user device may also be the computing device used to receive the information from the customer. Based on the input data, the number of work units required for testing the project is determined. As an example, the work units are measured in terms of the resources required for executing the project. At execution of each phase of the project testing there is variation in the number of work units. The work units are associated with a cost value. The information associated with the variation in the number of work units is provided to the user device.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows a block diagram illustrating a project testing system 100 in accordance with some embodiments of the present disclosure.

The project testing system 100 comprises an interface 101, a memory 103 and a processor 105. The interface 101 and the memory 103 are communicatively coupled to the processor 105. The memory 103 stores processor-executable instructions which on execution cause the processor 105 to perform one or more steps. In an embodiment, the input interface 101 is used to receive the input data of one or more requirements for project testing. The input data is received from a user device. In an embodiment, the user device may be a computing device associated with a business customer. In another embodiment the computing device may be associated with a user of the project testing system 100. The user may be a business analyst or a quality analyst or a business customer of an organization. The user may identify the requirements of the project from the business customer and provide the data to the computing device. The input data is provided to the processor 105. In an embodiment, input data of one or more projects may be received by the project testing system 100. The project testing system 100 stores the input data in the memory 103. The processor 105 determines the total number of work units required for testing each project. In an embodiment, the project testing environment includes one or more phases. As an example, the one or more phases are requirement phase, design phase, construction phase and implementation phase. The processor 105 determines the number of work units required for executing each phase in the project testing. The number of work units is the number of resources required for testing the project. As an example, the work unit may be measured in terms of number of people required for completing testing of the project, the time required to test the project and number of test cases to be created for testing the project and the like. In an embodiment, each work unit is associated with a cost value. For example, if the number of work units is 100 then the cost value for 100 work units may be 100$. As an example, the cost value may be assigned based on the past experience for the same project or may be based on the agreed value for the project with the business customer. The processor 105 provides the information of the initial agreed work units and the cost value to the user device. In an embodiment, the processor 105 may determine variation in the number of work units while executing one or more phase in the project testing. The variation in the number of work units may be due to one or more dependency parameters while executing the one or more phase in the project testing. As an example, the dependency parameters may include, but not limited to, time, number of people for testing the project, functional complexity etc. The processor 105 provides the information associated with the variation in the number of work units to the user device through the output interface 101.

Figure 1B:
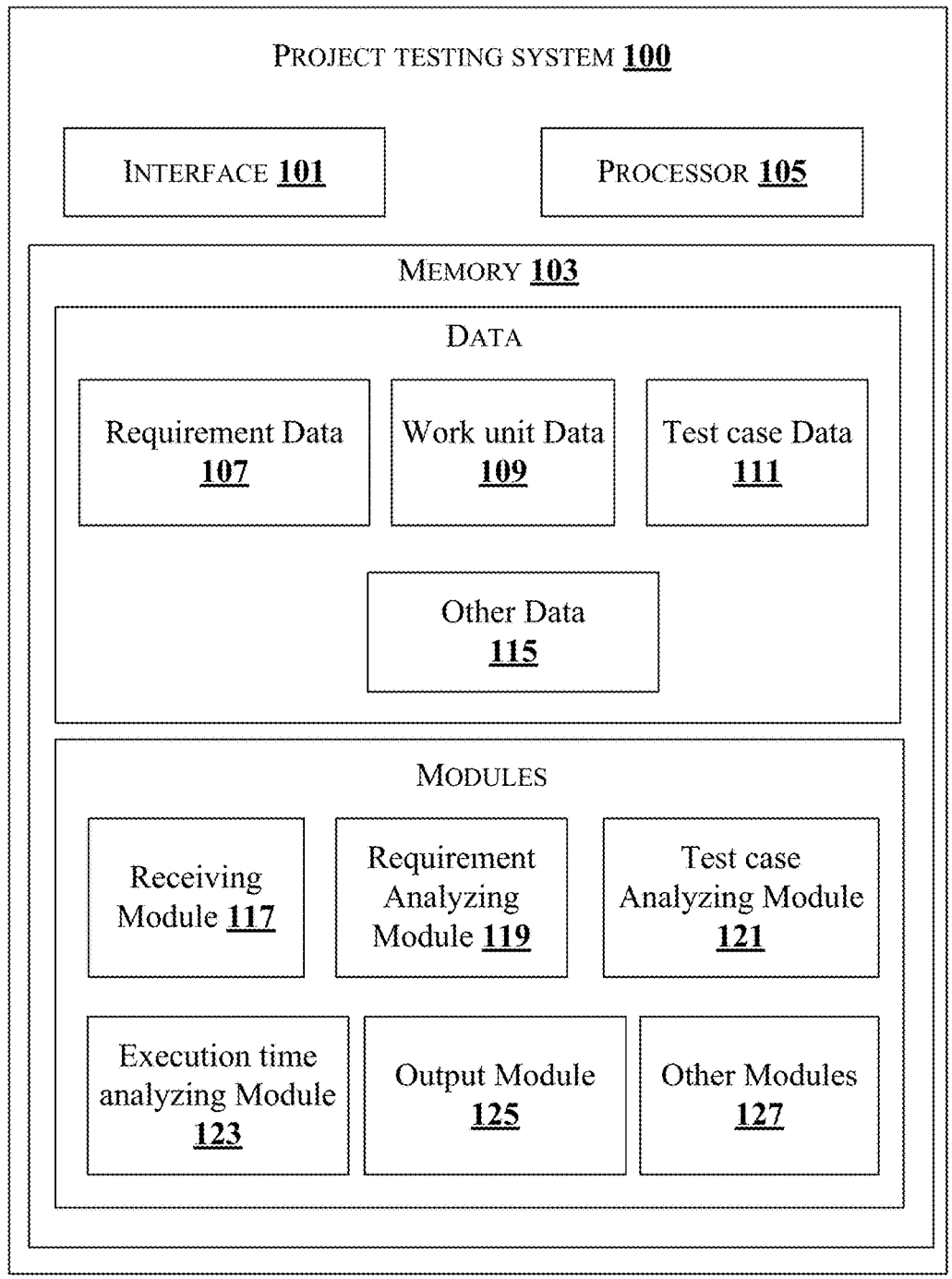
FIG. 1b shows a detailed block diagram illustrating a project testing system in accordance with some embodiments of the present disclosure.

FIG. 1b shows a detailed block diagram illustrating a project testing system 100 in accordance with some embodiments of the present disclosure.

In one implementation, the project testing system 100 receives input data from a user device. As an example, the received input data is stored within the memory 103. In an embodiment, the input data includes requirement data 107 (alternatively referred as requirements). The project testing system 100 also includes work unit data 109, test case data 111 and other data 115. In the illustrated FIG. 1b, one or more modules stored in the memory 103 are described herein in detail.

In one embodiment, the data may be stored in the memory 103 in the form of various data structures. Additionally, the aforementioned data can be organized using data models, such as relational or hierarchical data models. The other data 115 may store data, including temporary data and temporary files, generated by modules for performing the various functions of the project testing system.

In an embodiment, the requirement data 107 is received from the user device. The project testing system 100 identifies the project of the business customer based on the requirements data received from the user device. The requirement data may include information of the number of test cases required for testing the project, type of test cases to be created for testing the project and the like. The data associated with the requirements of the project are stored in the memory 103.

In an embodiment, the work unit data 109 is associated with number of work units required for the project testing. The work units are the resources required for the project testing. Based on the requirements, the project testing system 100 determines the work units for each phase in the project testing. As an example, the one or more phases of the project testing are requirement phase, design phase, construction phase and implementation phase. In an embodiment, the project testing system 100 is associated with a requirement management system. The requirement management system comprises information of one or more projects executed by the project testing system 100. The requirement management system also comprises information of the number of work units required for execution of the one or more projects. As an example, the work units are determined based on the information available in the requirement management system for the similar project. The work units may also be determined based on the information or cost value provided by the business customer.

In an embodiment, the test case data 111 is associated with one or more test cases created for testing the project. The test cases are the set of conditions under which the project is tested. Based on the requirements of the projects one or more test cases are created for testing the project.

In an embodiment, the data stored in the memory 103 are processed by the modules of the project testing system. The modules may be stored within the memory 103 as shown in FIG. 1b. In an example, the modules, communicatively coupled to the processor 105, may also be present outside the memory 103. As used herein, the term module refers to an application specific integrated circuit (ASIC), an electronic circuit, a hardware processor 105 (shared, dedicated, or group) and memory 103 that execute one or more software or firmware programs, a combinational logic circuit, and/or other suitable components that provide the described functionality.

In one implementation, the modules may include, for example, a receiving module 117, requirement analyzing module 119, test case analyzing module 121, execution time analyzing module 123, output module 125 and other modules 127. The other modules 127 may be used to perform various miscellaneous functionalities of the project testing system 100. It will be appreciated that such aforementioned modules may be represented as a single module or a combination of different modules.

In an embodiment, the receiving module 117 is configured to receive input data of one or more requirements of the project. The input data is received from the user device. The receiving module 117 also receives data from the requirement management system associated with the project testing system. The requirement management system is a database to store information associated with the one or more project executed by the project testing system.

In an embodiment, the requirement analyzing module 119 is configured to determine the number of work units required for testing the project. Based on the requirements of the project the requirement analyzing module determines the number of work units required for executing each phase in the project testing. As an example, 10% percentage of the total number of work units may be required for the requirement phase. Similarly, 10% of the total number of work units may be required for the design phase, 75% for the construction phase 5% for the implementation phase. In an embodiment, each work unit is associated with a cost value. The cost value is assigned based on the reference data for the same type of project executed by the project testing system 100. The reference data is stored in the requirement management system. The reference data is provided to the requirement management system by a user of the requirement management system for example a business analyst or a quality analyst. In an embodiment, the business customer may provide the cost value for testing the project. In an embodiment, the number of work units is not a constant value. The number of work units varies depending on the dependency parameters during execution of each phase in the project testing. The information associated with the number of work units is provided to the output module. The output module provides the information to the user device.

In an embodiment, the test case analyzing module 121 is configured to determine the number of test cases required for testing the project. Based on the requirements, the test case analyzing module 121 determines the number of test cases required for testing the project. However, during execution of the test case creation phase, the number of test cases may vary. Since there is variation in the number of test cases, the number of work units also varies. The variation in the number of work units is calculated using predetermined exemplary formulas as shown below in table 1. The dependency parameters and the formulas in table 1 are for the purpose of illustration and should not be construed as limiting the scope of the present disclosure. The information associated with the variation in the number of work units is provided to the output module 125.

TABLE 1

| No | Parameters impacting work units | Dependency Parameter 1 (P1) | Dependency Parameter 2 (P2) | Total Work Units Proposed |
|---|---|---|---|---|
| A | Sprint Planning | A *P1 = 10% of total requirements | Nil | A*P1 |
| B | Test Case Creation | B*P1 = 30% of total requirements | Nil | B · P1 |
| C | Test Case Execution | C*P1 = 50% of total requirements | Nil | C · P1 |
| D | Demo/Retro | D*P1 = 10% of total requirements | Nil | D · P1 |
| E | Data Setup/ Environment | E*P1 = Value in % age which is agreed upon with PM and RM | Nil | Total requirements * E · P1 |
| F | No. of Test Cycles * | F*P1 = 50% of total requirements | F*P2 = No of cycles that needs to be executed | Total requirements * F · P1 * F · P2 |
| G | Automation Scripting | G · P1 = % age of test cases to be automated | G · P2 = Total test cases | (G · P1 * G · P2)/ Total test case that can be automated per unit |

TABLE 1-continued

| No | Parameters impacting work units | Dependency Parameter 1 (P1) | Dependency Parameter 2 (P2) | Total Work Units Proposed |
|---|---|---|---|---|
| H | Automation Exec* | H · P1 = No. of automated test scripts that needs to run | H · P2 = No. of cycles that needs to be executed | (H · P1 * H · P2)/ Total units consumed to run 1 automated test script |
| I | Reg. Cycles* | I · P1 = No. of units needed for regression cycle | I · P2 = No. of cycles that needs to be executed | I · P1 * I · P2 |
| J | Time Factor* (Days) | J · P1 = Total units per day calculated based on Total units for an activity/ total days | J · P2 = No. of days of delay | J · P1 * J · P2 |
| K | 3rd P Factor* | K · P1 = Agreed upon % age of requirements | Nil | Total requirements * K · P1 |
| L | Niche Tech* | L · P1 = Agreed upon % age of requirements | Nil | Total requirements * L · P1 |
| M | Performance Testing* | M · P1 = Total No. of units that is needed calculated and agreed upon with PM and RM | M · P2 = No. of cycles that needs to be executed | M · P1 * M · P2 |
| N | Others* | N · P1 = No of units agreed with PM and RM | N · P2 = No. of times | N · P1 * N · P2 |

In an embodiment, the execution time analyzing module 123 is configured to determine one or more dependency parameters during execution of the project testing. As an example, the dependency parameters includes, but not limited to, time, number of people required for testing the project, functional complexity and the like. The one or more dependency parameters are shown in the below table 2. The dependency parameters indicated in Table 2 are for the purpose of illustration and should not be construed as limiting the scope of the present disclosure. As an example, during the requirement phase of the project testing the time measured for testing the project was 24 hours. However, during execution of the project testing, the time required was 12 hours. Since there is reduction in time, the number of work units is also reduced and the information of reduced number of work units is provided to the output module 125.

TABLE 2

| Dependency Parameter | Description |
|---|---|
| Time | More than 5% variation in delivery to quality analyst (QA) team [Example. If QA has 20 business days to deliver in a phase, 5% deviation means we can have a delay of up to 1 business day without impact to schedule or cost. Any delay over that may have an impact to cost and/or schedule.] |

TABLE 2-continued

| Dependency Parameter | Description |
|---|---|
| Regression or Multiple Cycles or Release level testing | Quality of delivery from development team, creating multiple cycles. Extra execution cycles due to multiple county rollouts Extra regression cycles or regression from previous phases to be executed as part of current project plan |
| Third Party Dependency | Some projects where integration with third party companies is required may need extra coordination for QA. This will be discussed with the project team upfront. |
| New Niche Technologies | If a new technology/platform is introduced in a project, this could impact the overall testing effort |
| Performance Testing | This is needed only in certain projects and will be covered additionally. |
| Test Automation | Special automation if needed by the project Automation with accelerators for Test Case development is included in the QA Unit of Work |
| Dependencies on batch and other process | Some projects where the test execution results depends on batch jobs which takes more 2 days to complete |
| Any functional complexity unique to the portfolio | Some projects where test execution consume more than standard execution hours due to application flow/ complexity. (e.g. 3-4 hrs. per test case) |
| Variations in the execution process | Projects follow multiple type of testing. |
| Specific On/off ratio | Projects where offshore execution is not possible/ limited due to technology/infrastructure limitation. |

In an embodiment, the output module 125 is configured to provide the information to the user device on the variation in the number of work units. As an example, the information is provided using a share point portal or an e-mail portal. The share point portal is a centralized portal for storing information associated with one or more projects executed by the project testing system.

Figure 2:
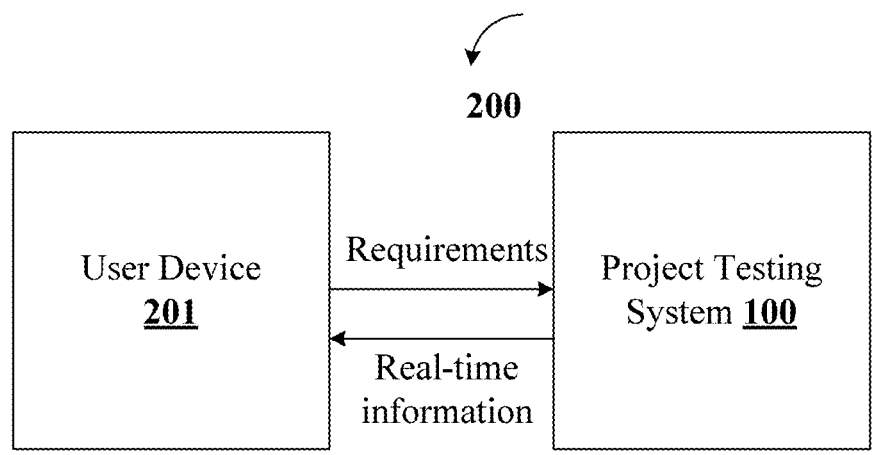
FIG. 2 shows a block diagram illustrating an exemplary environment for improving testing services in project testing environment in accordance with some embodiments of the present disclosure.

FIG. 2 shows a block diagram illustrating an exemplary environment for improving testing services in project testing environment in accordance with some embodiments of the present disclosure.

In an exemplary embodiment as illustrated in FIG. 2, the user device is configured to receive input of one or more requirements of one or more projects for execution. The one or more requirements may be provided by a user. The user may be a business analyst or a quality analyst. The user provides the requirements based on the information received from the business customer for project testing. In an embodiment, the requirements are provided to the project testing system 100. Upon receiving the requirements, requirement analyzing module 119 of the project testing system 100 determines the number of work units required for execution of each phase in the project testing. The one or more phases in the project execution are requirement phase, design phase, construction phase and implementation phase. The requirements phase is configured to perform static testing of the project. The design phase is configured for designing the test scenarios for the project testing. The construction phase is configured for the creation of the test cases and execution of the test cases. The test cases are used for testing the project. The implementation phase is configured for performing user acceptance testing. The number of work units is determined for each phase in the project testing. As an example, the total number of work units required for the project testing is 200 units. 10% of the 200 work units are assigned for the requirement phase. 10% of the 200 units are required for the design phase. 25% of the 200 work units are assigned for the test case creation phase, 50% of the 200 units are assigned for the test case execution phase and 5% of the 200 work units are assigned for the implementation phase i.e 20 work units each for the requirement phase and the design phase, 50 work units for the test case creation phase, 100 work units for the test case execution phase and 10 work units for the implementation phase. As an example, the time required for execution of each phase except the implementation phase may be one month. The time required for execution of the implementation phase is 15 days.

As an example, the initial value i.e the initial number of work units assigned for the requirement phase is 20. The work units consumed during the execution of the requirement phase is 20. There is no variation in the number of work units during the requirement phase. Further, the number of work units assigned for execution of the design phase in the project testing is 20. The number of work units consumed during the execution of design phase of the project testing is 20. There is no variation in the number of work units during the design phase. The number of work units assigned for test case creation is 50 work units. However, during execution of the test case the number of work units consumed is 45. There is variation in the number of work units during the test case creation phase due to the dependency factor "time". Initially the number of days required for the test case creation phase was one month for creation of 500 test cases. However, the test cases were created within 15 days since only 250 test cases had to be created based on the requirement. The number of test cases has been reduced from 500 to 250. Therefore, there is variation in the number of work units from 50 to 45. Similarly, the number of work units assigned for the execution of the test cases is 100. However, during run execution of the test cases the number of work units consumed is 50. There is variation in the number of work units. Therefore, the total number of work units has been reduced from 200 units to 145 units. The information associated with the variation in the number of work units and the cost value is provided to the user device 201 though the output module 125.

Figure 3:
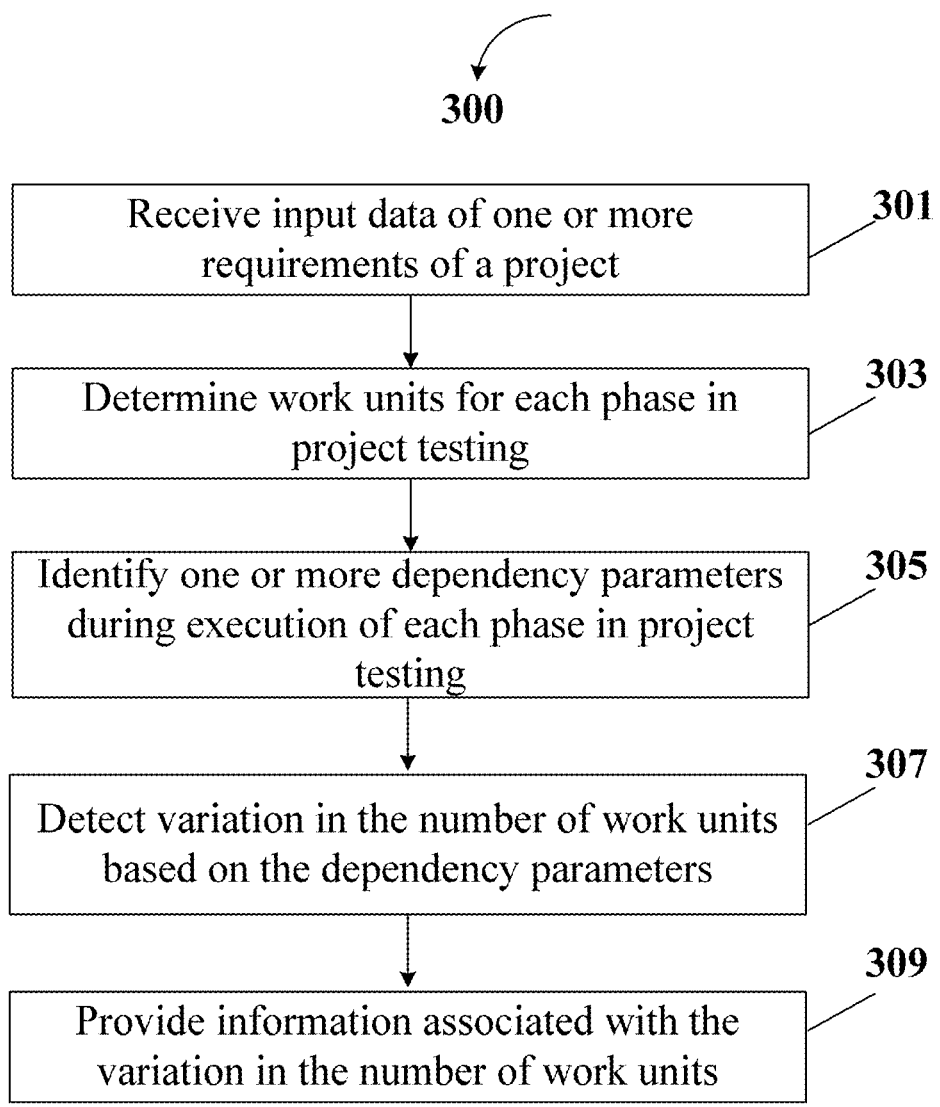
FIG. 3 illustrates a flowchart showing method for improving testing services in project testing environment in accordance with some embodiments of the present disclosure.

FIG. 3 illustrates a flowchart showing method for improving testing services in project testing environment in accordance with some embodiments of the present disclosure.

As illustrated in FIG. 3, the method 300 comprises one or more blocks for improving testing services in a project testing environment using a project testing system 100. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, input data of one or more requirements of the project testing are received. In an embodiment, the receiving module 117 of the project testing system 100 receives input data of one or more requirements for project testing. The project testing is categorized into one or more phases. As an example, the one or more phases of project testing are requirement phase, design phase, construction phase and implementation phase. In an embodiment, the requirements are received from a customer.

At block 303, work units required for each phase in the project testing are determined. In an embodiment, the requirement analyzing module 119 identifies the number of work units required for executing each phase in the project testing. In an embodiment, the test case analyzing module identifies number of test cases required for testing the project.

At block 305, the one or more dependency parameters are identified. In an embodiment, the execution time analyzing module 123 identifies one or more dependency parameters while executing each phase in the project testing. As an example, the one or more dependency parameters include, but not limited to, time, third party dependency, variation in the execution process of the project and functional complexity.

At block 307, the variation in the number of work units are detected. In an embodiment, the execution time analyses the effect of the one or more dependency parameters during the project testing. Due to the dependency parameters, the execution time analyzing module 123 detects the variation in the number of work units.

At block 309, the information associated with the variation in the number of work units is provided. In an embodiment, the output module acts as an interface 101 to the customer. The information associated with the variation in the number of work units, cost associated with the work units and the cost of each project is provided to the customer.

Figure 4:
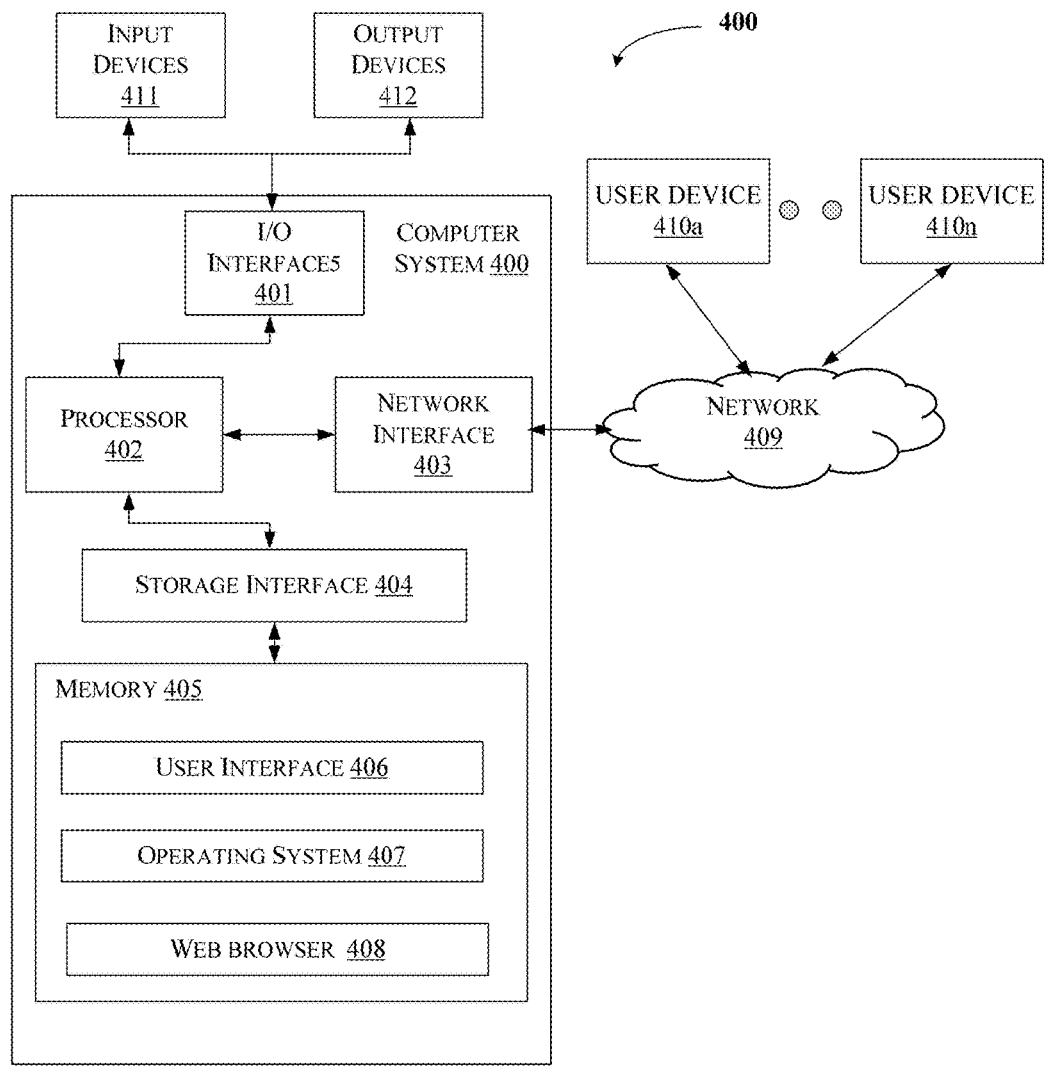
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used to improve testing services in a project testing environment using a project testing system 100. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides transparency to the business customer in terms of cost involved while project testing.

In an embodiment, the present disclosure provides a method to determine the work units required at each phase of the project testing. If there is any variation in the work units while executing each phase of the project testing, the information of the work units is provided to the business customer.

In an embodiment, the present disclosure provides a method to provide information to the business customer about the resource management and timely delivery of the project.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of improving testing services in a project testing environment, the method comprising:
   receiving, by a project testing computing device, input data of one or more requirements for testing a project, from a user device;
   determining, by the project testing computing device, a number of work units required for testing the project based on the input data, wherein each work unit is associated with a resource and a cost value;
   detecting, by the project testing computing device, a variation in the number of work units at each phase of testing for testing the project, based on one or more dependency parameters, wherein the one or more dependency parameters comprises a time parameter, a functional complexity parameter, or a performance testing parameter, and wherein the phase of testing is one of a requirements phase, a design phase, a construction phase, or an implementation phase; and
   providing, by the project testing computing device, information associated with the variation in the number of work units in each phase of the testing and the cost value, to the user device.

2. The method as claimed in claim 1, wherein information associated with the number of work units is provided to the user device.

3. The method as claimed in claim 1, wherein determining the variation in the number of work units comprises: identifying, by the project testing computing device, the one or more dependency parameters at execution of each phase of the project testing.

4. The method as claimed in claim 3, wherein the information associated with the variation in number of work units includes information associated with the identified one or more dependency parameters.

5. The method as claimed in claim 1 further comprising: creating, by the project testing computing device, one or more test cases for the project testing based on the input data.

6. The method as claimed in claim 1, wherein the number of work units required for the project testing is determined for each phase of the project testing.

7. A project testing computing device comprising a processor and a memory coupled to the processor which is configured to be capable of executing programmed instructions comprising and stored in the memory to:
   receive input data of one or more requirements for testing a project, from a user device;
   determine a number of work units required for testing a project based on the input data, wherein each work unit is associated with a resource and a cost value;
   detect a variation in the number of work units at each phase of testing for testing the project, based on one or more dependency parameters, wherein the one or more dependency parameters comprises a time parameter, a functional complexity parameter, or a performance testing parameter, and wherein the phase of testing is one of a requirements phase, a design phase, a construction phase, or an implementation phase; and
   provide information associated with the variation in the number of work units and the cost value in each phase of the testing, to the user device.

8. The device as claimed in claim 7, wherein the processor coupled to the memory is further configured to be capable of executing at least one additional programmed instruction comprising and stored in the memory to: provide information associated with the determined work units to the user device.

9. The device as claimed in claim 7, wherein the processor coupled to the memory is further configured to be capable of executing at least one additional programmed instruction comprising and stored in the memory to: determine the variation in the number of work units by identifying the one or more dependency parameters at execution of each phase of the project testing.

10. The device as claimed in claim 7 wherein the processor coupled to the memory is further configured to be capable of executing at least one additional programmed instruction comprising and stored in the memory to: create one or more test cases by the processor for the project testing based on the input data.

11. The device as claimed in claim 7, wherein the number of work units required for the project testing is determined for each phase of the project testing.

12. A non-transitory computer readable medium having stored thereon instructions for improving testing services in a project testing environment comprising executable code which when executed by a processor, causes the processor to perform steps comprising:
   receiving input data of one or more requirements for testing a project, from a user device;
   determining a number of work units required for testing a project based on the input data, wherein each work unit is associated with a resource and a cost value;

detecting a variation in the number of work units at each phase of testing for testing the project, based on one or more dependency parameters, wherein the one or more dependency parameters comprises a time parameter, a functional complexity parameter, or a performance testing parameter, and wherein the phase of testing is one of a requirements phase, a design phase, a construction phase, or an implementation phase; and providing information associated with the variation in the number of work units and the cost value in each phase of the testing, to the user device.

13. The medium as claimed in claim 12 further having stored thereon at least one additional instruction that when executed by the processor causes the processor to perform at least one additional step comprising: providing information associated with the work units to the user device.

14. The medium as claimed in claim 12 further having stored thereon at least one additional instruction that when executed by the processor causes the processor to perform at least one additional step comprising: determining the variation in the number of work units by identifying the one or more dependency parameters at each phase of the project testing.

15. The medium as claimed in claim 12 further having stored thereon at least one additional instruction that when executed by the processor causes the processor to perform at least one additional step comprising: creating one or more test cases for the project testing based on the input data.

16. The medium as claimed in claim 12, wherein the number of work units required for the project testing is determined for each phase of the project testing.

* * * * *